Sept. 16, 1924.                    E. C. PRATT                    1,508,857
                                    LOADER
                             Filed Sept. 30, 1922        4 Sheets-Sheet 1
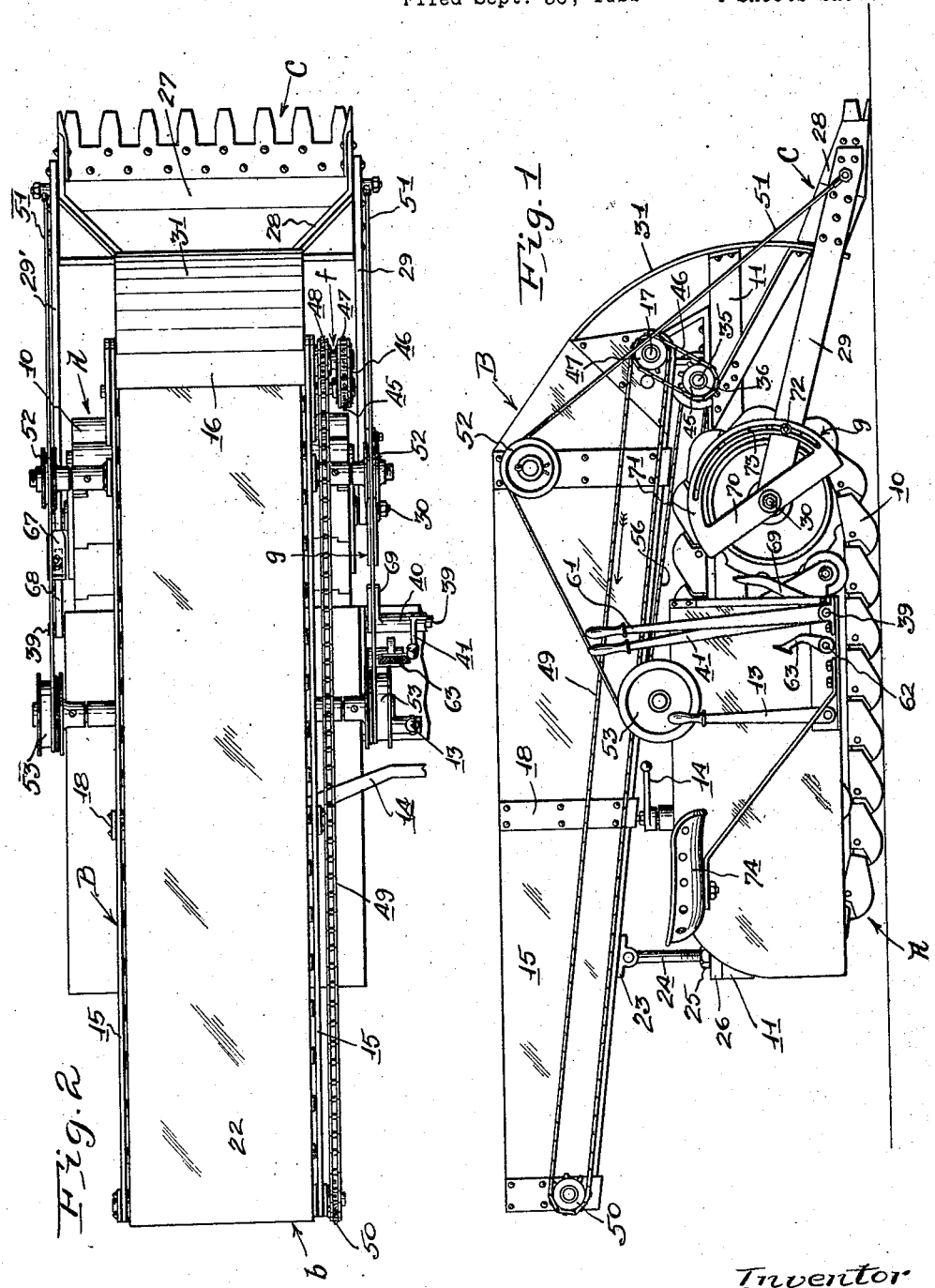
Inventor
Ernest C. Pratt
By Bradbury + Caswell
          Attorneys Sept. 16, 1924.

E. C. PRATT

LOADER

Filed Sept. 30, 1922     4 Sheets-Sheet 2

1,508,857

Inventor
Ernest C. Pratt
By Bradbury & Caswell
Attorneys

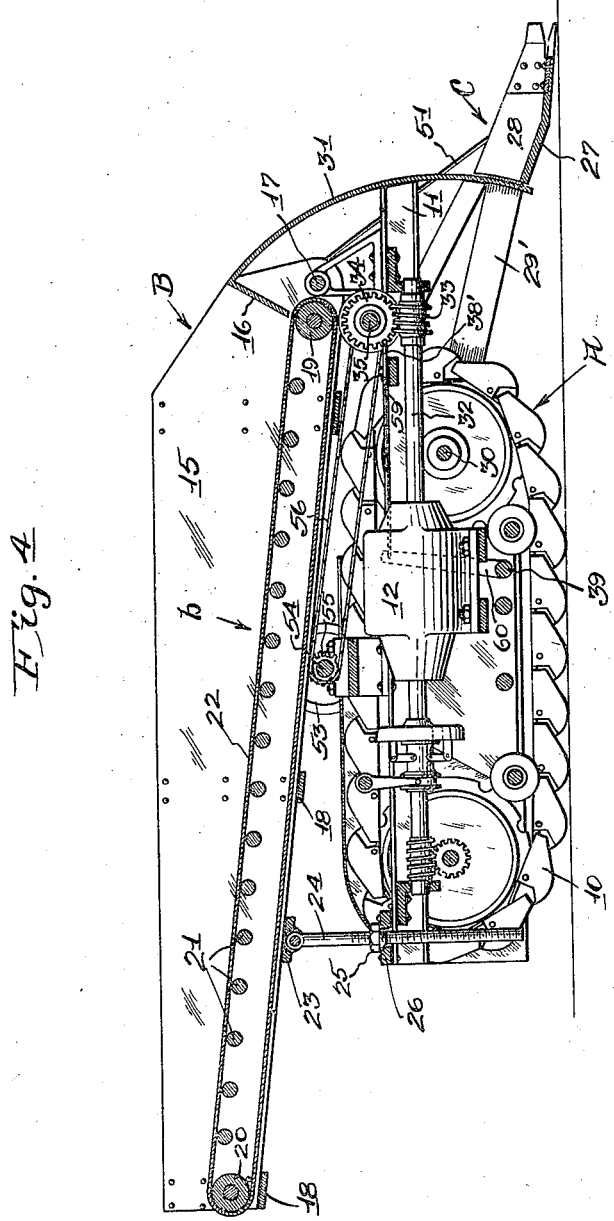

Sept. 16, 1924.

E. C. PRATT

LOADER

Filed Sept. 30, 1922   4 Sheets-Sheet 4

1,508,857

Inventor
Ernest C. Pratt
By Bradbury & Caswell
Attorneys

Patented Sept. 16, 1924.

1,508,857

UNITED STATES PATENT OFFICE.

ERNEST C. PRATT, OF MINNEAPOLIS, MINNESOTA.

LOADER.

Application filed September 30, 1922. Serial No. 591,440.

*To all whom it may concern:*

Be it known that I, ERNEST C. PRATT, a citizen of the United States, residing in Minneapolis, in the county of Hennepin and State of Minnesota, have invented a new and useful Loader, of which the following is a specification.

My invention relates to improvements in loaders.

Broadly its object is to provide a durable and efficient loader particularly, though not exclusively, for mining operations, said loader being adapted to pick up loads of material, distribute and store the same temporarily and finally discharge the accumulated loads.

More specifically it is my object to supply a loader including a self-propelled truck carrying a shovel adapted to be directed into the material to be loaded by appropriately guiding said truck, also including a hopper to receive loads from the shovel, said hopper having a movable bottom for distributing the loads therein and ejecting the same therefrom, the bottom of the hopper and said shovel being operated by the truck propelling medium.

With the foregoing and other objects in view, which will appear in the following description, the invention resides in the novel combination and arrangement of parts and in the details of construction hereinafter described and claimed.

Figure 5:
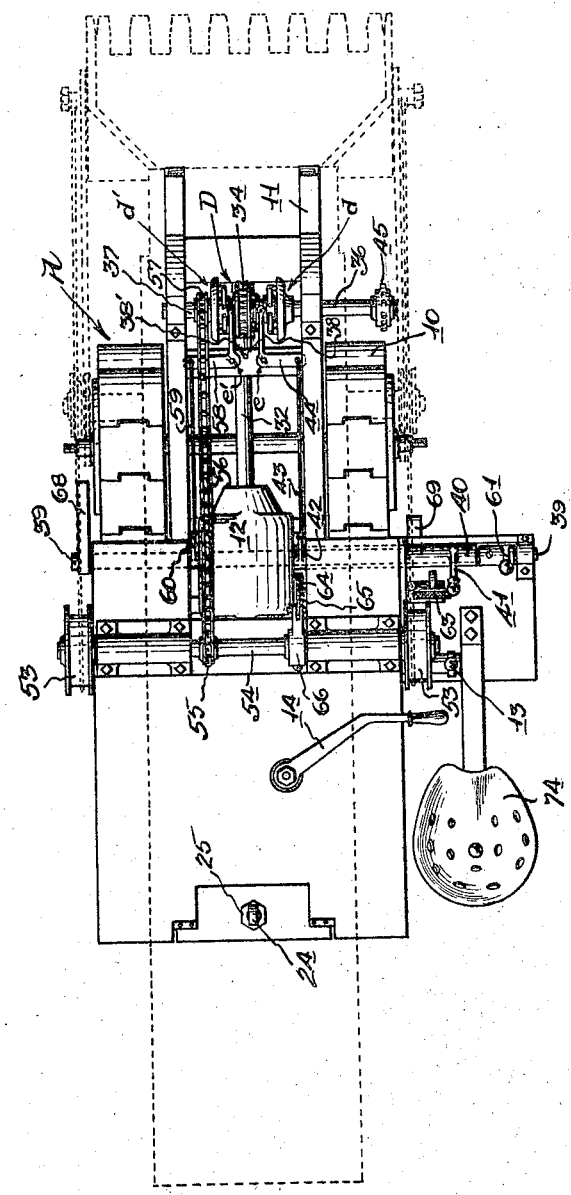
Figure 5:
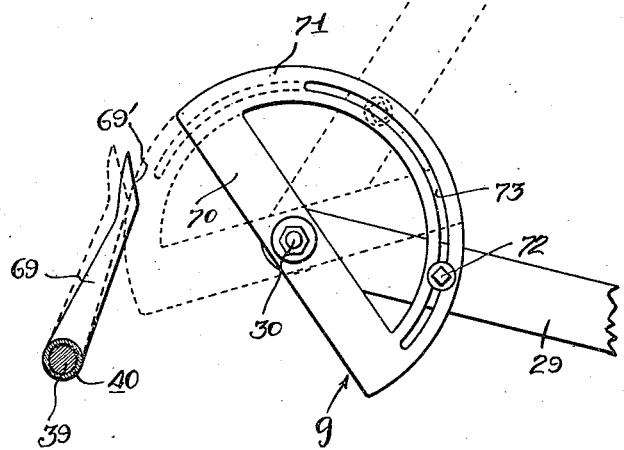
Figure 6:
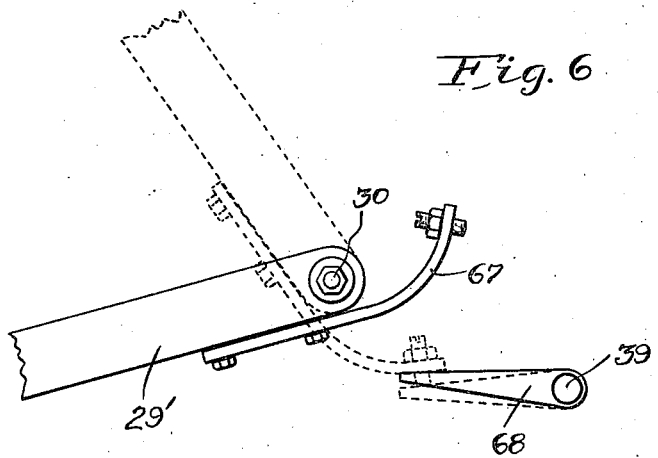

In the drawings, Fig. 1 is a side elevation of a loader embodying my invention; Fig. 2 is a plan view thereof; Fig. 3 is a similar view illustrating, particularly, the mechanism beneath the hopper, the shovel and hopper in this view being shown in dotted lines; Fig. 4 is a longitudinal, central, sectional view of the loader; Fig. 5 is a diagrammatical view of the parts whose co-action effects the automatic step by step movement of the conveyor and Fig. 6 is a similar view of the parts whose co-action results in automatically arresting the throw of the shovel at its upper extremity.

In the drawings, wherein similar reference characters are employed to designate similar parts throughout the several views, A indicates a truck, B a hopper and C a shovel. The truck A is of the type which is limited in elevation and easily maneuvered. It comprises a pair of endless treads 10, a truck frame 11, a motor 12 geared to said treads and traction control and steering levers 13 and 14 all of usual construction. The hopper B includes sides 15, a combined end and chute 16 and a conveyor *b* forming a movable bottom for the hopper. Said sides 15 are pivoted at their forward ends on a horizontal shaft 17 carried transversely of the truck frame 11 at the forward end thereof. These sides 15 are rigidly joined by means of U-shaped tie brackets 18 and supply a frame-work for the conveyor structure. This structure includes end rollers 19 and 20 (Fig. 4) and intermediate rollers 21 all journaled between the sides 15. An endless apron 22 turns upon said end rollers 19 and 20, its upper reach being supported between said rollers by the rollers 21. Depending from a beam 23 on the under side of the hopper B is a threaded prop 24. A nut 25 on this prop has a universal bearing on a beam 26 on the truck frame 11 and provides for raising and lowering the free end of the hopper B.

The shovel C comprises an open ended body having a bottom 27 and sides 28, also beams 29, 29' carrying said shovel body at their forward ends, said beams being suitably pivoted at their rear ends to the ends of the front axle 30 of the truck A. A curved guard 31 anchored to the truck frame 11 closes the back of the shovel body in all of its various positions except at the upper limit of travel where the contents of the bucket fall by gravity, over the end 16, onto the head of the conveyor *b*. Said end 16 reaches upwardly and forwardly from the front end of the apron 22 to the top of the guard 31 and, as above indicated, has the combined function as an end for the hopper B and as a chute for directing material from the shovel C to the conveyor *b*.

A drive shaft 32 (Figs. 3 and 4), reaching forwardly from the motor 12, is geared through a worm 33 and worm wheel 34 with a composite counter shaft structure D mounted transversely of the frame members 11 of the truck A. Said counter shaft structure is of usual design and while it is not illustrated in elaborate detail its construction will be understood from a brief description in connection with the drawings, particularly Figs. 3 and 4. Said structure D includes a driving shaft 35 fixed to the worm wheel 34 and reaching from either side thereof, also driven sleeves 36 and 37 on said driving shaft. Clutch sets $d$, $d'$ of ordinary design and including the usual shifter yokes 38, 38' are respectively interposed between the sleeves 36 and 37 and the driving shaft 35 of the counter shaft structure D. A rock-shaft 39 extending transversely of the truck A rockably carries a sleeve 40 having an upright hand lever 41 at its outer end and an upright arm 42 at the inner end thereof. A link 43 joins said arm 42 with an arm 44 of a bell crank $e$ on the truck frame, the second arm of said crank comprising the shifter yoke 38 of the clutch set $d$. A sprocket wheel 45 on the sleeve 36 is connected through a sprocket chain 46 with the member 47 of a dual idler sprocket $f$ journaled on the shaft 17 that supplies the pivotal support for the hopper B. The second member 48 (Fig. 2) of the dual sprocket $f$ is connected through a sprocket chain 49 with a sprocket wheel 50 on the driving roller 20 of the conveyor $b$. With the motor 12 in motion and the members of the clutch set $d$ disengaged, the conveyor $b$ remains at rest. Following a pull upon the lever 41, the members of said clutch set are engaged whereupon the roller 20 is turned in a direction to drive the apron 22 in a direction carrying its upper reach rearwardly.

The loader is maneuvered to fill the shovel C, said shovel being thereafter elevated to discharge the contents thereof into the front of the hopper B. The mechanism for raising said shovel includes a pair of cables 51 reaching from the forward ends of the beams 29, 29' over sheaves 52 on the sides of the hopper B to winding drums 53 on a drum shaft 54 journaled transversely of the truck. A sprocket 55 on the drum shaft 54 is connected through a chain 56 with a sprocket 57 on the sleeve 37 of the counter shaft structure D. The shifter yoke 38' comprises one arm of a bell crank $e'$, the second arm 58 thereof being joined through a link 59 with an arm 60 on the rock-shaft 39 above mentioned. This rock-shaft has a hand lever 61 thereon in close proximity to the hand lever 41. A pull upon the lever 61, engages the members of the clutch set $d'$ and results in turning the drums 53 and in elevating the shovel C through the winding of the cables 51 upon said drums. By releasing or pushing said lever 61 forward, the members of the clutch set $d'$ are disengaged, the shovel C being then free to fall by gravity. To control the movement of the shovel C in its fall, I supply braking mechanism for the drum shaft 54, the same including a rock-shaft 62 (Figs. 1 and 3) having a pedal 63 at one end thereof and an arm 64 at the other, said arm being joined through a link 65 with a brake band 66 of ordinary design encircling said drum shaft 54.

To prevent an operator from accidentally raising the shovel too far and thereby imposing unnecessary strains upon the device, as by the pulling of the beams 29, 29' against the sheaves 52, I supply an automatic trip for disengaging the shovel elevating mechanism from the source of power. This trip includes an arm or extension 67 (Figs. 2 and 6) on the end of the shovel beam 29' and a lever 68 on the rock-shaft 39, said arm 67 being arranged to strike the lever 68 and turn the rock-shaft 39, when the shovel C reaches position of discharge, the turning of said rock-shaft operating to free the shovel from the source of power in the manner attained by turning said shaft 39 through the medium of the hand lever 61.

Means including a lever 69 (Figs. 1 and 5) and cam $g$ provide for automatically advancing the conveyor $b$ upon each operation of the shovel C, whereby it is unnecessary for the operator to personally attend to the step by step advancement of the conveyor during the loading of the hopper B. Said lever 69 reaches upwardly and forwardly from the sleeve 40, the upper end of said lever having a cam surface 69' thereon. The cam $g$ comprises an arm 70 pivoted on the front axle 30 of the truck A and a quadrant 71 integral with said arm, said quadrant being held in selected angular relation with respect to the shovel beam 29 by means of a binding bolt 72 anchored in said beam and reaching through a slot 73 in the quadrant. The cam $g$ is preferably set so that the arm 70 will throw the lever 69 rearwardly and start the conveyor $b$ as the shovel C swings into its elevated position of discharge. With this adjustment of said cam, the upper reach of the apron 22 starts and moves rearwardly as material falls from the shovel, over the chute 16, onto said apron, said movement of said apron being arrested by the lowering of the shovel C. From the foregoing, it will be understood, that the conveyor is shifted a step upon each operation of the shovel, the movement of the conveyor being initiated as the shovel moves into discharging position and continuing until said shovel falls from such position. In normal operation, each automatic distributing step of the apron 22 continues temporarily after the shovel is emptied and until it reaches depressed position wherein the cam $g$ and lever 69 are disengaged. This movement of the apron 22 after the flow of material thereto has ceased results in presenting a clear portion thereof for the reception of the initial and greater part of the next shovel load, the balance of which is distributed on said apron during the beginning of its next distributing step.

An operator on the seat 74 advances, reverses and turns the loader to load the shovel C and to locate the rear of the hopper B over a receptacle, chute, conveyor or the like for receiving the contents of the hopper, the desired elevation of the delivery end of said hopper being attained by suitable adjustment of the nut 25. A pull upon the lever 61 results in elevating the shovel C, the lifting thereof being automatically arrested when the shovel reaches its position of discharge. Said shovel C being arrested in its upward throw by disconnecting the same from the motor 12, is held in its position of discharge and lowered under control of the operator through the medium of the pedal 63 and associated braking mechanism. In the upper part of the cycle of said shovel, the conveyor *b* is advanced a step automatically, as hereinbefore explained, thus causing successive shovel loads to be distributed over the bottom of the hopper B. Having located the delivery end of the hopper over the desired receptacle, the operator pulls upon the lever 41, causing a continuous movement of the conveyor *b* and the resultant discharge of the contents of the hopper B into said receptacle. This continuous ejecting movement of said conveyor is arrested upon releasing said lever 41. The emptying of the hopper B also may be accomplished by holding the shovel C in position of discharge. This is not particularly advantageous in all cases, but in certain instances it saves time and the trouble of manipulating the lever 61.

Changes in the specific form of my invention, as herein disclosed, may be made within the scope of what is claimed without departing from the spirit of my invention.

Having described my invention, what I claim as new and desire to protect by Letters Patent is:

1. In a loader of the class described, a truck, a conveyor on the truck for receiving, temporarily storing and discharging material, a shovel for picking up loads and discharging the same on said conveyor, a source of power for propelling the truck, operating the shovel and driving the conveyor and means for automatically causing said conveyor to advance when the shovel is positioned to empty its contents, whereby material falling from the shovel is spread upon said conveyor.

2. In a loader of the class described, a truck, a conveyor carried on the truck, a shovel on said truck movable between receiving positions and elevated position of discharge above one end of the conveyor, a source of power for propelling the truck, elevating the shovel and driving the conveyor and means for automatically connecting the conveyor with said source of power, upon each operation of the shovel, to shift said conveyor a step, said means being adjustable to vary the length of the steps taken by said conveyor.

3. In a loader of the class described, a truck, a conveyor carried on the truck for receiving, temporarily, storing and discharging material therefrom, a shovel on said truck movable between receiving positions and elevated position of discharge above the receiving end of the conveyor, a source of power, a power train associated therewith and with said conveyor for driving the latter and dual actuating mechanisms incorporated in said power train, one mechanism being adjustably associated with the shovel and adapted upon each operation thereof to be tripped thereby and to cause said conveyor to be geared with said source of power and variably advanced a step preparatory to receiving a fresh charge from said shovel, the second mechanism being manually operable to effect continuous movement of the conveyor and the resultant discharge of the material accumulated thereon.

4. In a loader of the class described, a truck, a conveyor carried on the truck for receiving, temporarily, storing and discharging material therefrom, a shovel on said truck movable between receiving positions and elevated position of discharge above the receiving end of the conveyor, a source of power, a power train associated therewith and with said conveyor for driving the latter and dual actuating mechanisms incorporated in said power train, one mechanism being associated with the shovel and adapted upon each operation thereof to be tripped thereby and to cause said conveyor to be geared with said source of power and advanced a step preparatory to receiving a fresh charge from said shovel, the second mechanism being manually operable to effect continuous movement of the conveyor and the resultant discharge of the material accumulated thereon.

5. In a loader of the class described, a truck, a conveyor carried on the truck, a shovel on said truck movable between receiving positions and elevated position of discharge above one end of the conveyor, a source of power for elevating the shovel, a power train between said source of power and shovel, manually operated means incorporated in said power train for actuating the same to cause the elevation of said shovel and an adjustable tripping device associated with said shovel for automatically interrupting the application of lifting power to the shovel at predetermined elevation thereof.

6. In a loader of the class described, a truck, a conveyor carried on the truck, a shovel on said truck movable between receiving positions and elevated position of discharge above one end of the conveyor, a source of power for elevating the shovel, a power train between said source of power and shovel, manually operated means incorporated in said power train for actuating the same to cause the elevation of said shovel and a tripping device associated with said shovel for automatically interrupting the application of lifting power to the shovel at predetermined elevation thereof.

In testimony whereof, I have signed my name to this specification.

ERNEST C. PRATT.